July 10, 1951 F. F. FULTON 2,559,761
TRACTOR SIGHT
Filed July 26, 1949

INVENTOR.
FRANK F. FULTON,
BY
McMorrow, Berman & Davidson
ATTORNEYS.

Patented July 10, 1951

2,559,761

UNITED STATES PATENT OFFICE 2,559,761

TRACTOR SIGHT

Frank F. Fulton, Plevna, Mont.

Application August 26, 1949, Serial No. 112,418

3 Claims. (Cl. 33—46)

This invention relates to field marker sighting means enabling the driver of a tractor to drive the tractor along a predetermined straight line, the primary object of the invention being to provide a practical and efficient device of this kind which is easily and quickly installed for use and removable for storage when not in use, and which permits the driver to easily and accurately follow the predetermined line without the usual effort.

Another important object of the invention is to provide a sighting device of the above-indicated character which is of simple and rugged construction, is designed for mounting on the tractor hood, and which is adjustable laterally and vertically for accurate sighting.

Other important objects and advantageous features of the invention will be apparent from the following description and the accompanying drawings, wherein, merely for purposes of illustration herein, a specific embodiment of the invention is set forth in detail.

Figure 1:
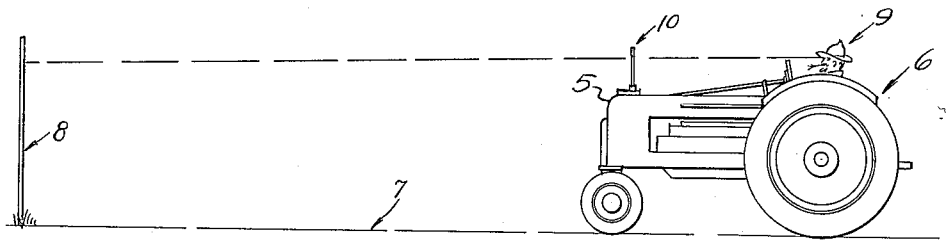
Figure 1 is a general schematic view showing in side elevation a tractor equipped with a sight aligned on a field marker.
Figure 2:
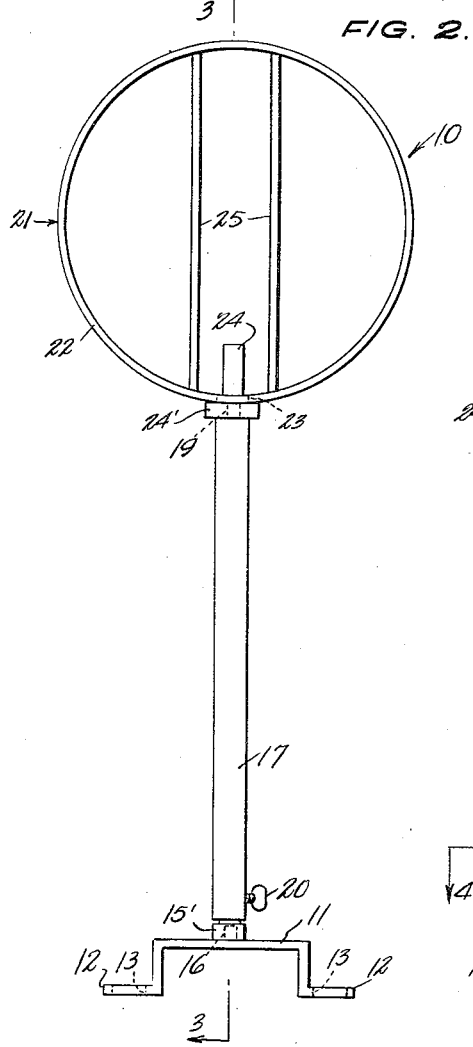
Figure 2 is a rear elevation of the sight.

Referring in detail to the drawings, wherein like numerals designate like parts throughout the several views, the numeral 5 generally designates the hood of a conventional farm tractor 6, here shown in Figure 1, as aligned to travel along a straight line over the ground 7 in the direction of an upright marker 8 erected in the ground 7, the driver 9 of the tractor being in the usual position behind the hood and looking forwardly toward the marker 8 through the sight 10.

The sight 10, one or more of which may be employed, is shown in Figure 1 as mounted on the forepart of the tractor hood 5. The sight 10 is mounted on the center line of the hood 5 when the driver's seat is centrally placed, and in any case is mounted on the hood 5 so that with the driver 9 in his normal driving position, the line of sight will be substantially horizontal, and parallel to a straight forward course of the tractor 6.

The sight 10 comprises a base in the form of an inverted U-shaped plate 11 having oppositely-directed ears 12 on the lower ends of its legs, arranged to rest cross-wise upon the top of the hood 5. The ears 12 are provided with elongated slots 13, through which studs 14 are projected and threaded into the top of the hood. The elongation of the slots 13 enables the sight to be adjusted laterally on the hood into the driver's line of sight for a straight, forward course of the tractor.

Figures 3, 4:
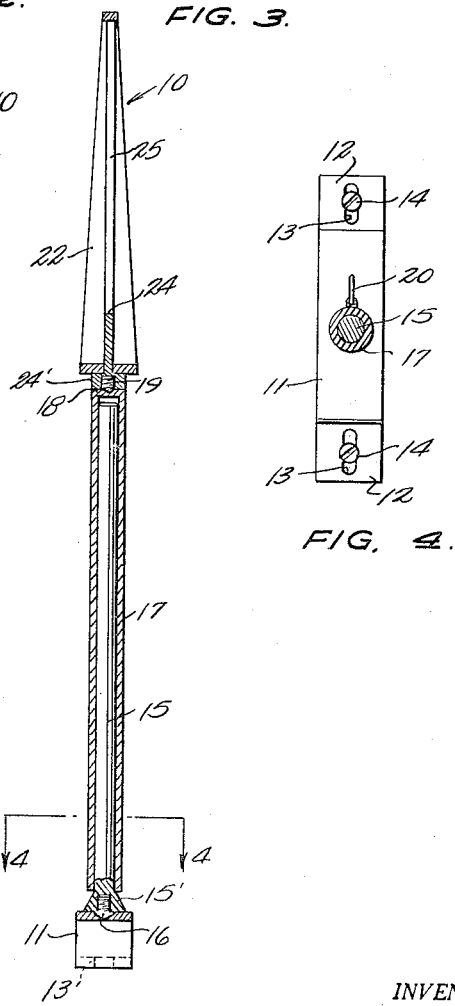
Figure 3 is a transverse vertical section taken through Figure 2 on the line 3—3.
Figure 4 is a horizontal section taken on the line 4—4 of Figure 3.

A perpendicular smooth rod 15 has an enlargement 15' on its lower end to rest upon the center of the base plate 11, and a stud 16 is passed upwardly through the base plate and threaded into the boss 15', as shown in Figure 3, to mount the rod 15 removably on the base plate 11. Telescoped slidably on the rod 15 is a tubular rod 17, closed at its upper end, as indicated at 18, and provided with a threaded stud 19 rising therefrom. A winged set screw 20 traverses the lower part of the tubular rod 17 for locking the tubular rod at various desired elevations on the rod 15.

Mounted on the upper end 18 of the tubular rod 17, is the sighting element, generally designated 21, and comprising a ring 22 formed of flat material placed crosswise of the line of sight and having an upwardly-tapering profile when viewed from either side, as shown in Figure 3. A flat upright sighting lug 24 rises from a wider and thicker boss 24' which is threaded on the stud 19 on the upper end of the tubular rod 17. The middle of the lower part of the ring 22 is formed with a slot 23 removably receiving the lug 24, with the ring 22 resting upon the top of the boss 24'.

Two parallel perpendicular sighting bars 25, 25 are connected to the top and bottom parts of the ring 22 in positions at opposite sides of the sighting lug 24.

When the sight is not in use, the rod 15 may be disconnected from the bracket or base 11 by threading the boss 15' off the stud 16 and the assembly comprising the rod 15, the rod 17, and the ring 22 removed and stored in a suitable place on the tractor. The adjustment of the rod 17 on the rod 15 need not be disturbed.

In using the device, the tractor 6 is lined up with the field marker 8 and with another marker (not shown) at the starting point for the tractor and the sight 10 then adjusted vertically and transversely relative to the tractor to put the driver's line of sight on the marker 8 between the sighting bars 25, 25 and in line over the sighting lug 24. Thereafter, in driving the tractor on its course, the driver merely guides the tractor so as to preserve the described visual relation between the marker 8 and the bars 25, 25 and lug 24 of the sight 10, and the result is a straight course to the marker 8. If desired, with the rods 15 and 17 removed, the sight 10 may be mounted on the base plate 11 by screwing the sighting lug 24 on the stud 16 and putting the ring 22 in place on the lug 24 as before.

I claim:

1. In a sight for guiding a tractor on a line of sight toward a distant field marker, a base securable to the tractor, a vertical rod removably connected at its lower end to said base, a tubular rod slidably telescoped on said vertical rod, means for holding said tubular rod in a vertically adjusted position on said vertical rod, a sighting lug comprising a boss secured to rise from the upper end of said tubular rod, and a portion rising from said boss, and a ring positioned in a vertical plane extending crosswise of the line of sight, the lower part of said ring being formed with a slot receiving said portion with said lower part of the ring resting upon said boss and said lug portion rising above the lower part of said rod midway between the sides of the ring.

2. In a sight of the character described, a base, a first threaded stud rising therefrom, a plain vertical rod having an enlargement on its lower end threaded on said stud and engaging said base, a tubular rod slidably telescoped on said plain rod, means for retaining said tubular rod in a vertically adjusted position on said plain rod, said tubular rod having a closed upper end, a second threaded stud rising from said upper end, a sighting lug comprising a boss threaded on said second stud and engaging the upper end of said tubular rod and a portion rising above said boss, and a ring positioned in a vertical plane extending crosswise of the line of sight, said ring having a lower part formed with an opening through which said lug portion extends with the lower part of the ring resting upon said boss, said lug portion rising to a level above the lower part of the ring in a position midway between the opposite sides of said ring.

3. In a sight for guiding a tractor on a line of sight toward a distant marker, a base adapted to be secured to a tractor, a rod rising from said base, a ring mounted on the upper end of said rod and positioned in a vertical plane extending crosswise of the line of sight, and a sighting lug mounted on said rod nad extending upwardly above the lower part of said ring in a position midway between the sides of said ring, said ring having a pair of parallelly spaced bars extending vertically across the ring at opposite sides of said sighting lug.

FRANK F. FULTON.

REFERENCES CITED

The following references are of record in the file of this patent:

UNITED STATES PATENTS

| Number | Name | Date |
|---|---|---|
| 340,128 | Kersey | Apr. 20, 1886 |
| 685,455 | Kinkead | Oct. 29, 1901 |
| 1,373,852 | Allen | Apr. 5, 1921 |
| 1,686,157 | Kauch et al. | Oct. 2, 1928 |
| 1,811,494 | Conway | June 23, 1931 |
| 2,046,581 | Reeves | July 7, 1936 |
| 2,360,368 | Rubissow | Oct. 17, 1944 |